United States Patent [19]

Rosback

[11] 3,720,604
[45] March 13, 1973

[54] ADSORBING OLEFINS WITH A COPPER-EXCHANGED TYPE Y ZEOLITE

[75] Inventor: Donald H. Rosback, Elmhurst, Ill.

[73] Assignee: Universal Oil Products Company, Des Plains, Ill.

[22] Filed: Aug. 16, 1971

[21] Appl. No.: 172,322

Related U.S. Application Data

[62] Division of Ser. No. 865,980, Oct. 13, 1969, Pat. No. 3,649,177.

[52] U.S. Cl..............................208/310, 260/677 A
[51] Int. Cl. ...........................................C10g 25/04
[58] Field of Search....................208/310; 260/677 A

[56] References Cited

UNITED STATES PATENTS 3,510,423   5/1970   Neuzil et al. .........................208/310

Primary Examiner—Herbert Levine
Attorney—James R. Hoatson, Jr.

[57] ABSTRACT

A new composition of matter, a method for the preparation of a copper-exchanged Type Y structured zeolite and a separation process employing the same. The zeolite adsorbent is prepared by a procedure employing an aqueous ion-exchange step and a final step including contacting the copper-exchanged zeolite with a mixture containing a cuprous salt and a hydrocarbon. The process involves the selective separation of olefinic hydrocarbons from saturated hydrocarbons employing a Type Y structured zeolite containing copper cations at the cationic exchange sites within the zeolite. The olefins are selectively retained by an adsorbent and are removed in a concentrated form by a desorption step.

5 Claims, No Drawings

ADSORBING OLEFINS WITH A COPPER-EXCHANGED TYPE Y ZEOLITE

CROSS-REFERENCE TO RELATED APPLICATIONS

This is a divisional application of pending application Ser. No. 865,980, filed on Oct. 13, 1969, now U.S. Pat. No. 3,649,177.

BACKGROUND OF THE INVENTION

1. Field of the Invention

This invention relates to a new composition of matter, the manufacture of a zeolitic adsorbent and a separation process employing the same. More specifically, this invention relates to the production of a zeolitic adsorbent having improved adsorptive capacities together with an extremely low degree of activity toward the materials being separated by the adsorbent. More specifically, this invention relates to a hydrocarbon separation process employing a specially prepared adsorbent to effectively separate olefins from feed streams containing saturates and olefins in an efficient manner using an adsorbent having a high adsorptive capacity for olefins with a resulting low activity toward polymerization and isomerization of the olefins being adsorbed.

2. Description of the Prior Art

It is well known in the separation art that certain types of molecular sieves can be employed to separate olefins from saturates. The adsorbents employed in these separation processes are generally crystalline aluminosilicates modified with a selective metal from the groups generally consisting of the IA, IIA and IB metals. In most cases, the metals are ion-exchanged onto the zeolite by known methods and effect an increased capacity of the sieve for the adsorption of olefinic type materials. The method of this invention places copper cations in a Type Y structured zeolite to effect an increased capacity of the zeolite for olefinic hydrocarbons while employing a method of manufacture of said adsorbent which eliminates the activity of the zeolite when it is exchanged with a copper cation. The copper cation appears to have an inherent ability to polymerize or isomerize olefinic type hydrocarbons which are adsorbed within the adsorbent when separating olefinic hydrocarbons from saturated hydrocarbons. I have found that through the use of a novel treatment or method of manufacture operations that a zeolite which has been exchanged with a first aqueous copper solution and which has been subsequently contacted with a mixture of a hydrocarbon and a cuprous salt solution that the inherent polymerization and isomerization activity can be essentially eliminated while the sieve is improved in olefinic adsorptive capacities.

The prior art in general has not recognized the effects of copper on the olefins being adsorbed within a copper exchanged adsorbent. Since the copper-exchanged type Y structured zeolites generally cause side reactions to occur, thereby reducing the efficiency of a separation process employing a copper-exchanged Type Y structured zeolite, the method of my invention substantially improves both the adsorbent and the process where olefinic hydrocarbons are to be separated efficiently from saturated hydrocarbons while presenting a new composition of matter.

SUMMARY OF THE INVENTION

It is an object of the present invention to provide a method for the manufacture of a crystalline aluminosilicate zeolite which is inert toward polymerization or isomerization of olefinic type hydrocarbons through the use of a production procedure comprising aqueous ion-exchange conditions of a sodium Type Y zeolite followed by contacting the exchanged zeolite with a hydrocarbon and cuprous salt solution to condition the zeolite for the elimination of polymerization and isomerization of adsorbed olefins. It is another object of this invention to provide a process for the separation of olefins from saturated hydrocarbons which process employs a specially prepared copper-exchanged Type Y zeolite to effectively retain the high concentration of olefinic hydrocarbons within the zeolite while effectively excluding saturated hydrocarbons which enables a relatively efficient separation to take place via adsorptive separation techniques.

It is another object of the present invention to provide a composition of matter comprising copper and a crystalline aluminosilicate.

I have found that when employing a Type Y structured zeolite which has been copper-exchanged that the zeolite retains a larger quantity of the olefinic hydrocarbon within the sieves than when an equal volume of unexchanged sodium Type Y sieves are used. The increased adsorptive capacity of the copper-exchanged sodium Type Y structured zeolite is accompanied with an inherent activity which results in polymerization of the olefinic hydrocarbon to an extent that appreciable quantities of the adsorbed olefinic hydrocarbon are lost due to the polymerization and isomerization with the accompanying polymer deposited on the zeolite reducing the effectiveness of the adsorbent itself. I have found, however, that the sodium Type Y structured zeolite which is exchanged with copper by the method of my invention both increases the adsorptive capacity of the zeolite and eliminates the polymerization and isomerization of the olefins which heretofore has occurred when copper cations were ion-exchanged onto a sodium Type Y structured zeolite.

Both the natural and synthetic sodium Type Y crystalline aluminosilicates may be used as starting materials in the present method of manufacture. The crystalline zeolitic aluminosilicates are aluminosilicate cage structures in which the alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Subsequent partial or total dehydration of the zeolite results in a crystal structure interlaced with channels of molecular dimensions. Thus, the crystalline aluminosilicates are often referred to as molecular sieves. In the hydrated form, crystalline aluminosilicates may be represented by the formula represented in equation 1 below:

$$M_{2/n}O:Al_2O_3:wSiO_2:yH_2O \qquad (1)$$

where M is a cation which balances the electrovalence of tetrahedra, $n$ represents the valence of the cation, $w$ represents the moles of $SiO_2$, and $y$, the moles of water.

The Type Y zeolite may be represented in terms of the mole ratios of oxides for the sodium form as represented in equation 2 below:

$$0.9\pm0.2Na_2O:Al_2O_3:wSiO_2:yH_2O \qquad (2)$$

where $w$ is greater than about 3 and $y$ is any value up to about 9.

When the sodium form of the Type Y zeolite is ion-exchanged with copper, a portion or all of the sodium present within the zeolite is replaced by the copper ions. The copper-exchanged Type Y zeolites as used in this specification shall generally encompass those zeolites which have essentially all of the sodium present within the zeolite originally replaced by a copper cation to those zeolites which have had only a portion of the sodium replaced by a copper cation. Consequently, it is within the scope of this invention of using a copper-exchanged Type Y zeolite which may contain a portion of the original sodium ions only because in some instances in order to totally exchange sodium with copper ions extremely long contact times are required.

The copper-exchanged Type Y structured zeolites referred to in this specification shall generally encompass those zeolites which have been produced according to the method of manufacture of this invention and which may have a portion or all of the sodium originally present in the zeolite replaced by copper during the zeolite manufacture.

In separating the olefinic hydrocarbon from a hydrocarbon mixture containing saturated hydrocarbons and olefinic hydrocarbons, the feed is contacted with a bed of a copper-exchanged Type Y structured zeolite, the olefinic hydrocarbon is preferably retained or adsorbed within the pores of the adsorbent while the unadsorbed or raffinate mixture which comprises saturated hydrocarbons is removed from the interstitial void spaces and the surface of the solid adsorbent. The adsorbent is then contacted with a desorbent material which is capable of displacing the adsorbed olefinic hydrocarbons from the molecular sieve adsorbent.

The adsorbent can be contained in a single chamber where through program flow into and out of the chamber, separation of olefinic hydrocarbons is effected. Swing-bed operation techniques, where a series of adsorbent chambers are available or simulated moving bed countercurrent operations somewhat similar to those generally disclosed in the pattern of operations as disclosed in U.S. Pat. No. 2,985,589, can be used. In the latter method of operation, the selection of a suitable desorbent requires that it be capable of readily displacing adsorbed olefinic hydrocarbons from the adsorbent and also that the olefins in the feed mixture be able to displace the adsorbed desorbent from the adsorbent from a previous desorption step.

Charge stocks which may be used in the process of this invention contain olefins in the $C_{10}$ to $C_{20}$ carbon range. Of these olefins, the $C_{10}$ through $C_{15}$ range is particularly preferred for use in the separation process of this invention. The $C_{10}$ through $C_{15}$ normal mono-olefins are generally produced by catalytically dehydrogenating a $C_{10}$ through $C_{15}$ normal paraffin stream. The effluent stream from the hydrogenation step generally contains about 5 to 25 percent olefins and requires further processing for concentrating a normal olefinic hydrocarbon. The desorbents which can be used in the process of this invention will vary depending upon the type of operation employed herein. In the swing-bed systems in which the preferably adsorbed olefins are removed from the adsorbent by a purge stream, gaseous hydrocarbons or other type gases may be used at elevated temperatures or reduced pressures or both elevated temperatures and reduced pressures to effectively purge the selectively adsorbed olefins from within the adsorbent. However, in operations which are generally operated at substantially constant pressure and temperature conditions, the desorbent relied upon must be judiciously selected in order that it may displace the preferred olefin adsorbed from the feed within the adsorbent without unduly preventing the feed olefins from displacing the desorbent during subsequent adsorption operations. In cases where liquid phase, substantially isothermal and isobaric operations are effected, it is preferred to use an olefinic or aromatic desorbent. The desorbent may be either a normal mono-olefin or branched chain mono-olefin depending on the particular olefinic hydrocarbons chosen as a desorbent or an aromatic hydrocarbon such as benzene or toluene. One problem encountered when using straight chain mono-olefinic desorbents is that the lower chain mono-olefinic hydrocarbons are more tenaciously held by a copper-exchanged Type Y structured zeolite than the larger weight normal mono-olefinic hydrocarbons found in the feed. This results in difficulties in displacing the desorbent material from the adsorbent once the desorbent has displaced a feed olefin which has previously been adsorbed within the adsorbent.

Process operating conditions include adsorption cycle temperatures of from about 25°C. to about 250°C., with desorption cycle temperatures included within the same general limits. Preferably, the desorption and adsorption cycle temperatures are the same. The pressures which may be used are not critical and can vary from below atmospheric up to many atmospheres and preferably for ease of operations below about 1,000 psig. The pressures at which adsorption and desorption conditions are effected preferably are substantially the same. Specifically, the adsorption and desorption temperatures and pressures are the same with liquid phase operations especially preferred.

In testing various adsorbents to determine their respective olefinic adsorptive capacities and their degree of isomerization and polymerization activity, a dynamic testing apparatus was employed. The apparatus used consisted of an adsorbent chamber of approximately 40 cc. volume having inlet and outlet ports at opposite ends of the chamber. The chamber was contained within a temperature controlled means and in addition, pressure control equipment was used to operate the chamber at a constant predetermined pressure. Attached to the outlet line of the chamber was chromatographic analysis equipment which was used to analyze the effluent streams leaving the adsorbent chamber.

The following general procedures were used to determine the adsorptive capacity of the various adsorbents tested in the chamber. A feed mixture containing 16 vol.% decene-1 diluted with 84 vol.% iso-octane (2,2,4-trimethylpentane) was passed through the adsorbent bed until the effluent stream leaving the adsorbent chamber was essentially the same composition as the feed stream passing into the inlet of the adsorbent chamber indicating that there was essentially no net transfer between the fluid passing into the adsorbent chamber and the material adsorbed by the adsorbent.

A desorbent stream was then passed into the adsorbent chamber through the inlet to the chamber. The desorbent stream contained approximately 16 vol.% octene-1, 79 vol.% iso-octane and 5 vol.% isopentane which was used as a tracer in determining desorption characteristics when using the gas chromatographic analysis equipment attached to the outlet stream on the adsorbent chamber. The desorbent was passed through the adsorbent chamber at a carefully controlled rate to effect desorption of the adsorbed decene-1 from the adsorbent. The gas chromatographic equipment was used to measure the effluent stream during desorbent operation. Knowing the composition of the effluent stream and the flow rate of material passing out of the adsorbent chamber, it was possible to determine, for a given quantity of adsorbent, the volume of decene-1 that was adsorbed by the adsorbent.

Four sieves were tested using various methods of copper exchange to indicate the improved characteristics simplified by effecting production of the adsorbent by the method of this invention. Table I below indicates the various olefin adsorption capacities expressed in milliliters per 40 milliliters of sieves, the respective activities and the method by which copper was exchanged onto the zeolite.

TABLE I

| Sieve of Description | Olefin Adsorption ml./40 ml. Sieves | | catalytic activity % | Peak height decene-1 16=100% decene-1 | Exchange Medium |
|---|---|---|---|---|---|
| | octene-1 | decene-1 | | | |
| A | 2.79 | 2.40 | 0 | 16.0 | |
| B | 4.16 | 3.90 | 15.5 | 13.5 | Basic medium |
| C | 3.40 | 2.75 | 25 | 12.0 | Acid medium |
| D | 3.64 | 3.44 | 0 | 16.0 | Basic medium and hydrocarbon medium |
| E | 3.07 | 2.85 | 0 | 16.0 | Acid medium and hydrocarbon medium |

In referring to Table I above, sieve A was a basic sodium Type Y zeolite and as indicated adsorbed approximately 2.79 ml. of octene-1 per 40 ml. of sieves and 2.4 ml. of decene-1 per 40 ml. of sieves with essentially no sieve activity. The sieve activity as determined in the following experiments was determined by measuring the decene-1 peak which was generated by the gas liquid chromatographic analysis equipment on a strip chart.

In measuring the catalytic activity of an adsorbent, the following procedures were used. The gas chromatographic equipment which was attached to the outlet stream to analyze the material leaving the adsorbent chamber was used to determine the amount of feed olefins (decene-1) which were present in an effluent stream when a feed stream was constantly passed over the sieves at a temperature of 100°C. The loss of decene-1 as measured by the gas chromatographic analysis equipment indicated the degree of catalytic activity possessed by the copper-exchanged sodium Type Y zeolite. This catalytic activity was thought to be primarily due to polymerization reactions of the decene-1 olefins and to part of the decene-1 olefin being isomerized to various other internal olefinic isomers. The scale used to determine the activity of the adsorbent was directly determined by measuring the peak height on the chromatograph equivalent to 16 vol.% olefin as indicative of zero catalytic activity. Hence, on the scale used in this specification, 16 vol.% decene-1 present in the effluent material leaving the adsorbent chamber, which is the same concentration of the feed passing into the sorbent, represents a zero catalytic activity. A peak height of 8 would represent, as measured by the chromatograph, 8 vol.% decene-1 in the effluent. Therefore, a peak height of 8 would represent exactly 50 percent polymerization and isomerization of the decene-1 feed component. Equation 3 below represents the formula used to determine the catalytic activity of an adsorbent knowing the peak height as representative in volume percent of the decene-1 remaining in the effluent stream leaving the adsorbent chamber.

$$\text{Adsorbent Activity} = 100 - 100\,(P/16.0) \quad (3)$$

where P represents the peak height of the effluent stream chromatograph.

It is important in processes which separate olefinic hydrocarbons that the highly reactive olefins are not reacted into side products which degrade the product quality and reduce the overall yield of concentrated olefins in relation to the olefins present in the feed stream passed into the separation process. In instances where the feed streams contain normal olefinic hydrocarbons representing the various isomers of the particular molecular weight olefin, the isomerization effects of the copper-exchanged adsorbent are not adverse to the process economics where the prime consideration is the concentration of normal olefinic products streams. However, reduction of the polymerization activity of a copper-exchanged adsorbent is important. The polymerization in addition to reducing the yields of olefinic hydrocarbons in comparison to the olefins in the fresh feed also tends to degrade the adsorbent by impairing its adsorptive capacity and the rates which olefinic hydrocarbons can enter and leave the molecular sieve adsorbent. The polymerization effects are generally considered to be primarily physical impediments which tend to prevent the olefinic hydrocarbons from passing into the molecular sieve adsorbent by plugging up the surface of the molecular sieve adsorbent and the pores present in the structure of the adsorbent. In instances where a particular isomer of a normal olefinic hydrocarbon is desired to be concentrated from a feed stream which contains primarily a single olefinic isomer, the isomerization effects become equal, if not a greater problem, than the polymerization. It is, therefore, extremely important in most instances that the catalytic activity in regard to polymerization and isomerization reactions be substantially reduced or preferably totally eliminated by proper treating techniques and methods of manufacture of the molecular sieve adsorbent.

While reducing the temperature of the operations of an adsorption process, in which catalytic activity is present will substantially reduce the catalytic activity because of the associated reduction in the rate of reaction, this procedure in adsorptive separation processes employing molecular sieves, in most cases, is not effective because the reduction in temperature of the overall operations of the process reduces the kinetic energy of the materials passing into and out of the molecular sieve. This substantially reduces the rate of exchange of feed olefins into and out of the molecular sieve adsorbent and desorbent material into and out of the molecular sieve adsorbent giving, what is considered in the art, as poor breakthrough fronts which result in product contamination with feed stock and relatively high requirements of adsorbent for a given throughput of olefin-containing feed stock.

The following examples are illustrative of the method of manufacture of the adsorbent and are not to be construed as undue limitations on the inventive concept disclosed herein.

EXAMPLE I

In this example, the dynamic testing apparatus, as previously described, was employed to determine both the catalytic activity and the adsorption capacity of a Type Y zeolite. The sodium Type Y zeolite was of a small particle size comprising generally from 20 through 40 mesh material and was placed in the adsorption chamber previously described. The adsorption chamber was maintained at 100°C. with a suitable pressure imposed on the system to maintain liquid phase operations. Alternative streams of fresh feed and desorbent material were passed in a programmed manner through the adsorbent chamber to effect the generation of reproduceable results. After a suitable period of time which was required to obtain essentially stable operations, the adsorbent's catalytic activity and adsorptive capacity was calculated from the generated data. Table I above represents the results of the data generated using the various sieves of this and subsequent examples. The sodium form Type Y zeolite is represented in Table I by sieve A and, as can be seen, the adsorptive capacity for octene-1 and decene-1 respectively was 2.79 and 2.40 ml./40 ml. of sieves, with a relative catalytic activity of 0.

EXAMPLE II

In this example, a sodium Type Y zeolite was contacted with a basic solution containing a copper complex. The copper exchange procedures were as follows. One hundred milliliters of 20 through 40 mesh sodium Type Y zeolite was placed in a contacting chamber. A solution containing 42 grams of $Cu(NO_3)_2 \cdot 3H_2O$ and 50 ml. of 29 wt.% ammonium hydroxide was diluted to 600 ml. volume with deionized water. The 100 ml. volume of sodium Type Y zeolite was contacted at 25°C. with the 600 ml. of aqueous copper solution at a liquid hourly space velocity of about 9. After the entire 600 ml. of the basic copper exchange solution had contacted the sieves, the exchanged zeolite was backwashed to the visual extinction of the hydrated cupric ion and air equilibrated and thereafter calcined at 500°C. for approximately 1 hour. This adsorbent was then placed in a dynamic testing apparatus to determine the olefin adsorptive capacity and relative activity of the adsorbent. Sieve B of Table I represents the data obtained for adsorptive capacities and relative catalyst activities of this exchanged type zeolite. Notice that the adsorptive capacity was very high compared to sieve A (sodium Type Y zeolite not copper-exchanged) and was found to be 4.16 and 3.90 cc. per 40 cc. of sieves for octene-1 and decene-1 respectively while the catalyst activity represented by a peak height on the chromatograph of 13.5 was calculated to be 15.5 on the catalytic activity scale. This particular adsorbent, while possessing extraordinary high adsorptive capacities, does demonstrate that aqueous copper exchange using a basic medium for the copper exchange inherently gives an adsorbent which is catalytically active, therefore, which in this state is not acceptable to be used in the process of this invention.

EXAMPLE III

In this example, a sodium Type Y zeolite was contacted with an acidic solution of copper to effect exchange of copper cations into the adsorbent.

The following procedures were used in exchanging the sodium Type Y zeolite. One hundred ml. of 20 through 40 mesh particle size sodium Type Y zeolite was contacted with 600 ml. of a solution containing 42 grams of $Cu(NO_3)_2 \cdot 3H_2O$. The copper solution solution was acidic in nature because of the ionization characteristics of the copper nitrate salt. The solution was passed over the sieves at an LHSV of 9, which took approximately 40 minutes at 25°C. after which the zeolite was backwashed to the visual extinction of the hydrated cupric ion and thereafter air equilibrated and calcined at 500°C. for 1 hour prior to use in the dynamic testing apparatus. This prepared sieve was tested at 100°C. using the aforementioned conditions explained in Example I. The results of the test for catalytic activity and adsorptive capacity are presented in Table I and represented by sieve C. As can be seen in Table I, sieve C presented an improved capacity for both the octene-1 and decene-1 olefins while showing a catalytic activity of 25 percent as indicated by equation 3 above.

EXAMPLE IV

In this example, a sodium Type Y zeolite which had been exchanged in the basic medium as described in Example II above was contacted with a hydrocarbon cuprous chloride mixture. The hydrocarbon contacting step was carried out using the following procedures. One hundred ml. of the basic medium copper exchanged sodium Type Y zeolite (sieve B) was contacted, in batch operations, with 240 ml. of decene-1 which had added thereto 10 grams of solid cuprous chloride. The mixture of hydrocarbon, the cuprous salt and sieve B was placed in a beaker with a magnetic stirrer at 172°C. and contacted for 1 hour. The excess decene-1 and cuprous chloride was decanted from the sieves and the sieves were then washed with six 100 ml. portions of isopentane to remove excess decene-1 and unused solid cuprous chloride. The isopentane washed material was then purged dry with nitrogen to eliminate essentially most of the hydrocarbon present within the adsorbent. This material was tested in a dynamic testing apparatus, the results of which are reported in Table I for sieve D. As can be seen, the adsorptive capacity for sieve D was improved when compared to sieve A (sodium Type Y zeolite) and adsorbed 3.64 ml. of octene-1 per 40 ml. of sieves and 3.44 ml. of decene-1 per 40 ml. of sieves with a represented peak height of 16.0 which indicated a catalytic activity of 0 or an essentially inert adsorbent.

EXAMPLE V

Sieves similar to those made in a manner as explained in Example III (sieves C) were contacted with a hydrocarbon treatment step identical to that explained in Example IV above. These sieves were tested in a dynamic testing apparatus, and likewise, as those sieves tested in Example IV, sieves D, showed improved olefin adsorptive properties with essentially no catalyst activity. The sieves produced in this example were tested and are indicated in Table I as sieves E and had adsorptive capacities for octene-1 of the 3.07 ml. per 40 ml. of sieves and 2.85 ml. of decene-1 per 40 ml. of sieves with a relative activity of 0 indicating a totally inert adsorbent at the operating conditions of 100°C.

As can be seen from Table I, sieves D and E which were both subjected to the hydrocarbon-cuprous chloride contacting step were superior in adsorptive capacities for both decene-1 and octene-1 when compared to sieve A, which was the sodium Type Y zeolite. Both sieves D and E were essentially inert when compared to their respective counterparts, sieves B and C, respectively, which had not been contacted with a hydrocarbon treatment step.

It can then be seen that sieves B of Table I which were the basic medium copper-exchanged sodium Type Y sieves, although having an improved adsorptive capacity for olefins, possessed sufficient activity to show a 15 percent activity on the relative activity scale, while the sieves C which were copper-exchanged in an acid medium sodium Type Y zeolites additionally show an even higher catalyst activity represented by 25 percent on the relative activity scale. It can then be stated that the hydrocarbon treatment step for treating sodium Type Y zeolites increases the capacity of the zeolite while maintaining adsorbent inertness which was not seen for the copper-exchanged sieves which had not been subjected to treatment with hydrocarbon and cuprous chloride. The general operating procedures employing the dual-exchange procedures disclosed herein require that a sodium Type Y zeolite be first contacted with an aqueous solution containing a copper cation. The aqueous solution can comprise any copper salt which is reasonably soluble in water and because of dissociation considerations forms either an acidic or basic system. The Type Y zeolite is relatively resistent to both acidic and basic type mediums and can be exchanged without undue difficulty in either system. The exchange conditions can include temperatures from about 15°C. to about 250°C. for a period of time sufficient to exchange from about 50 percent to essentially all of the sodium present in the sodium Type Y zeolite. After the aqueous ion-exchange has gone to the degree required, the sieve is then dehydrated at conditions including a temperature from about 100°C. to about 550°C., depending upon whether complete or partial dehydration is required. It is preferred, however, to substantially dehydrate the zeolite without rendering its crystalline structure deformed because it has been found in most basic adsorptive separation processes that generally the greater the dehydration of the adsorbent, the greater the capacity of the adsorbent is for a particular hydrocarbon which will be adsorbed in the process. This is generally based on the fact that the water which is driven off the zeolite during dehydration conditions is present between and within the lattice structure of the zeolite. Consequently, total or partial dehydration renders more free volume within the zeolite which a particular hydrocarbon which is to be separated can occupy thereby increasing the overall capacity of a zeolite. After the preferred degree of dehydration has been accomplished, the zeolite is cooled and thereafter is contacted in the hydrocarbon treatment step. Presently, it is not understood the exact method by which the hydrocarbon treatment step passivates the copper exchanged Type Y structured zeolite, but the effects are noticeable; and for considerations in this disclosure, the hydrocarbon treatment step is considered to be a critical step in the manufacture of an inert adsorbent which has reasonable capacity for olefinic hydrocarbons. The hydrocarbon treatment step is accomplished by contacting the previously exchanged and dehydrated molecular sieve with a hydrocarbon stream which is intimately mixed with a cuprous salt. The temperature conditions of the critical hydrocarbon treatments step can vary from about 50°C. to about 300°C. with sufficient pressure maintained on the system when the hydrocarbon treatment step is taking place to maintain the hydrocarbon in substantially liquid form. The hydrocarbons which may be used for the hydrocarbon treatment step include olefinic hydrocarbons, or any other hydrocarbon which will form a soluble complex with the cuprous salt and which should necessarily be capable of passing within the pore openings of a copper-exchanged Type Y zeolite. The cuprous salt which may be used in the hydrocarbon treatment step preferably should include cuprous chloride. Other copper salts which may be used in the hydrocarbon treatment step includes cuprous bromide, cuprous cyanide, cuprous fluoride, cuprous thio-cyanide, etc.

PREFERRED EMBODIMENTS

An embodiment of this invention resides in a method for preparing a copper-exchanged Type Y structured zeolite which method comprises the steps of contacting a sodium form Type Y zeolite with an aqueous solution of a water-soluble copper salt at ion-exchange conditions to effect replacement of a portion of sodium by copper cations, heating the zeolite at dehydration conditions to effect at least a partial dehydration of the zeolite, and contacting the zeolite with a hydrocarbon mixture comprising a hydrocarbon and a cuprous salt at an elevated temperature. A second embodiment of the invention resides in a process for the separation of olefins from a hydrocarbon feed stream comprising olefins and saturated hydrocarbons which process comprises the steps of contacting said feed mixture with a bed of a zeolite adsorbent at adsorption conditions to effect retention of said olefins by said adsorbent, withdrawing from said bed of adsorbent a raffinate stream comprising less selectively retained saturated hydrocarbons, contacting the adsorbent bed with a desorbent material at desorption conditions to effect the desorption of said olefins from said adsorbent and withdrawing a stream containing olefins and desorbent, the process further characterized in that the improvement resides in employing a zeolite adsorbent produced by an aqueous copper ion-exchange step followed by treatment of the sieves with a mixture of a hydrocarbon and a cuprous salt.

A third embodiment of this invention resides in a composition of matter having copper disposed on a crystalline aluminosilicate zeolite.

I claim as my invention:

1. In a process for the separation of olefins from a feed mixture comprising olefins and saturated hydrocarbons which process comprises the steps of:
   a. contacting said feed mixture with a bed of a zeolite adsorbent at adsorption conditions to effect the selective retention of said olefins by said adsorbent;
   b. withdrawing from said bed of adsorbent a raffinate stream comprising less selectively retained saturated hydrocarbons;
   c. contacting the adsorbent bed with a desorbent at desorption conditions to effect desorption of said olefins from said adsorbent;
   d. withdrawing a stream containing olefins and desorbent;

wherein an improvement comprises employing a zeolite adsorbent prepared by the steps of:
   a. contacting a sodium form Type Y structured zeolite with an aqueous solution of a water-soluble copper salt at ion-exchange conditions to effect replacement of a portion of the sodium by copper cations;
   b. dehydrating at least a portion of said zeolite by heating dehydration conditions; and,
   c. contacting the zeolite with a mixture comprising a hydrocarbon and a cuprous salt, said hydrocarbon being capable of forming a soluble complex with the cuprous salt and passing within the pore openings of said zeolite.

2. The process of claim 1 further characterized in that said hydrocarbon feed contains olefins having from about six to about 20 carbon atoms per molecule.

3. The process of claim 1 further characterized in that said adsorption and desorption conditions include temperatures within the range of from about 25°C. to about 175°C. and pressures within the range of from about atmospheric to about 500 psig.

4. The process of claim 3 further characterized in that said adsorption and desorption conditions are effected in liquid phase.

5. The process of claim 1 further characterized in that said mixture comprising a hydrocarbon and a cuprous salt contains an olefinic hydrocarbon.

* * * * *